(12) United States Patent
Klein et al.

(10) Patent No.: US 8,327,506 B2
(45) Date of Patent: Dec. 11, 2012

(54) SOCKETING MATERIAL AND SPELTERED ASSEMBLY FOR TERMINATING TENSION MEMBER

(75) Inventors: Timothy W. Klein, St. Joseph, MO (US); Bamdad Pourladian, St. Joseph, MO (US)

(73) Assignee: Wireco Worldgroup Inc., Kansas City, MO (US)

( * ) Notice: Subject to any disclaimer, the term of this patent is extended or adjusted under 35 U.S.C. 154(b) by 1048 days.

(21) Appl. No.: 11/970,406

(22) Filed: Jan. 7, 2008

(65) Prior Publication Data

US 2008/0247813 A1 Oct. 9, 2008

Related U.S. Application Data

(60) Provisional application No. 60/884,033, filed on Jan. 9, 2007.

(51) Int. Cl.
*F16G 11/00* (2006.01)
(52) U.S. Cl. ........................................ 24/122.6; 403/268
(58) Field of Classification Search ................. 24/122.3, 24/122.6; 403/265, 268–272; 52/223.13; 14/21, 22
See application file for complete search history.

(56) References Cited

U.S. PATENT DOCUMENTS

| | | | |
|---|---|---|---|
| 3,507,949 A | 4/1970 | Campbell | |
| 3,660,887 A | 5/1972 | Davis | |
| 3,864,049 A | 2/1975 | Ono | |
| 4,395,798 A | 8/1983 | McVey | |
| 4,557,007 A * | 12/1985 | Daiguji et al. | 14/22 |
| 4,848,438 A | 7/1989 | Gray | |
| 5,136,755 A * | 8/1992 | Shaw | 24/122.6 |
| 5,611,636 A | 3/1997 | Flory | |
| 5,881,607 A | 3/1999 | Ito et al. | |
| 6,263,547 B1 | 7/2001 | Andersson | |
| 6,874,207 B2 | 5/2003 | Goch | |
| 7,007,350 B1 | 3/2006 | Franke | |
| 7,231,956 B2 | 6/2007 | Gregory | |
| 7,231,957 B2 | 6/2007 | Gregory | |
| 2002/0073898 A1 | 6/2002 | Schelinski | |
| 2004/0115142 A1 | 6/2004 | Sherwood | |
| 2005/0230075 A1 | 10/2005 | Gregory | |
| 2005/0230076 A1 | 10/2005 | Gregory | |
| 2005/0251972 A1 | 11/2005 | Gregory et al. | |
| 2006/0240967 A1 | 10/2006 | Hojaji et al. | |
| 2007/0119562 A1 | 5/2007 | Gregory | |

FOREIGN PATENT DOCUMENTS

| | | |
|---|---|---|
| DE | 10145537 A1 | 4/2003 |
| EP | 0949389 B1 | 10/1999 |
| EP | 0978666 A1 | 2/2000 |
| GB | 2212553 A | 7/1989 |
| JP | 2000013974 A | 1/2000 |
| NL | 46426 C | 3/1939 |

* cited by examiner

*Primary Examiner* — James Brittain
(74) *Attorney, Agent, or Firm* — Husch Blackwell LLP

(57) ABSTRACT

A socketing material (16), or mortar, for speltering wire rope, strand, and other tension members (14), comprising 35%-55% $AL_2O_3$; 32%-52% $SiO_2$; 0%-20% CaO; and 0%-2% $Fe_2O_3$. The material (16) may have a continuous-use temperature of at least 1000 degrees, at least 2000 degrees, or at least 2500 degrees Fahrenheit. A speltered assembly (10) is produced by introducing the material (16) into and allowing it to cure within a cavity (24) of a terminal fitting (12) around the ends of a plurality of wires (31) of a tension member (16) which are arranged within the cavity (24) in a spaced-apart relationship.

17 Claims, 2 Drawing Sheets

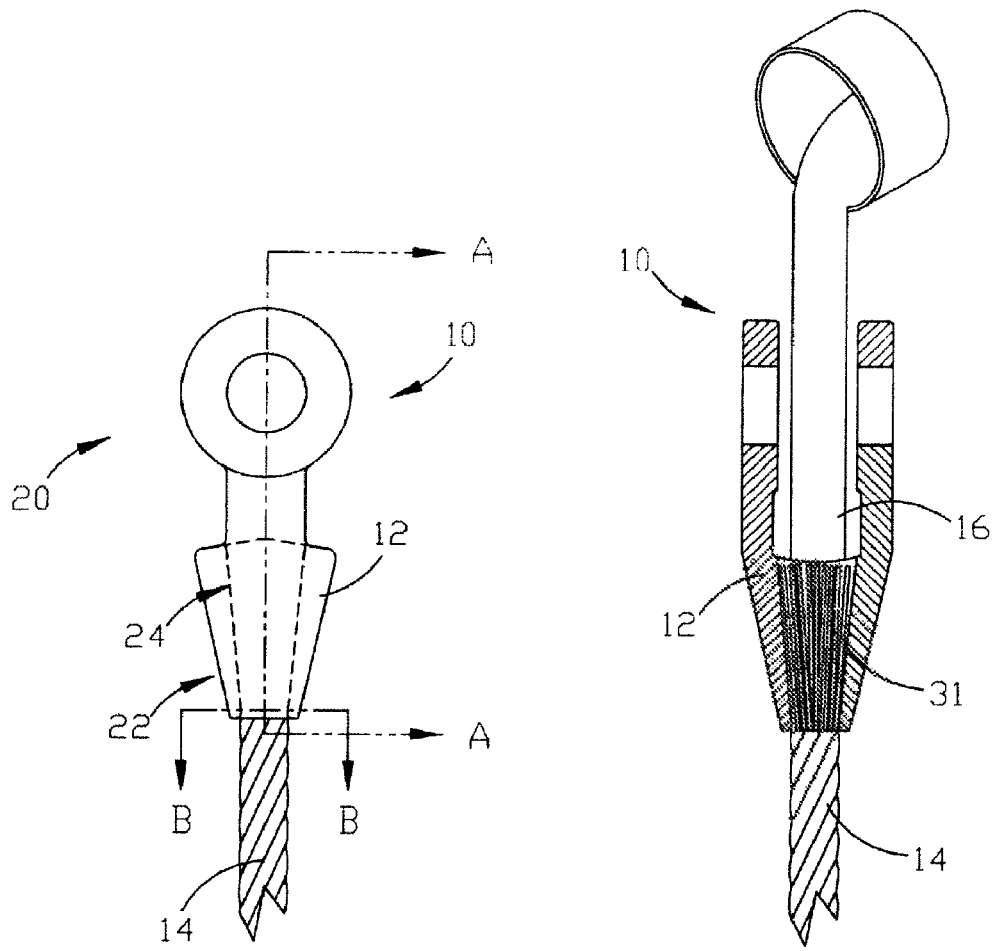
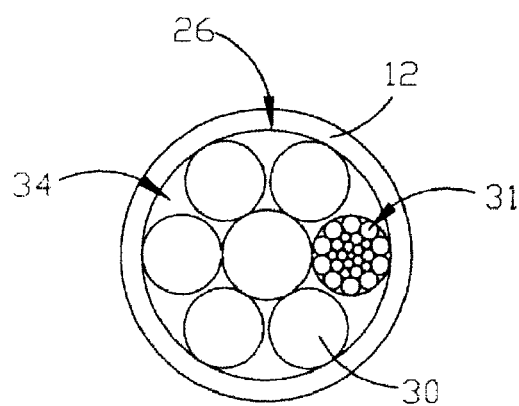
FIG. 1
FIG. 2 A-A
FIG. 3 B-B

SOCKETING MATERIAL AND SPELTERED ASSEMBLY FOR TERMINATING TENSION MEMBER

RELATED APPLICATIONS

The present non-provisional patent application is related to and claims priority benefit of an earlier-filed provisional patent application titled SOCKETING MATERIAL AND SPELTERED ASSEMBLY FOR WIRE ROPE, Ser. No. 60/884,033, filed Jan. 9, 2007. The identified earlier-filed provisional application is hereby incorporated by reference into the present non-provisional application.

FIELD OF THE INVENTION

The present invention relates broadly to socketing materials and speltered assemblies for terminating the ends of tension members. More specifically, the present invention concerns a socketing material, or mortar, for speltering wire rope, strand, and other tension members, wherein the socketing material flows sufficiently to fill voids around the wires of which the wire rope or strand is comprised, cures sufficiently fast to avoid undue loss during speltering, and is able to withstand high temperatures once cured.

BACKGROUND OF THE INVENTION

Wire rope comprises a plurality of wires that are twisted together, typically around a core. Strand comprises a plurality of wires that are twisted together. Wire ropes and strands have application in, for example, the construction of bridges and buildings and in the manufacture of guy lines for anchoring tower structures. It is often necessary to terminate the ends of wire ropes or strands, so that the ends can be secured to anchoring structures.

One type of termination is accomplished by looping the end of the wire rope. The resulting loop can then be used to secure the wire rope to the anchoring structure. Unfortunately, this type of termination can significantly weaken the wire rope by, in some applications, as much as approximately between 15% and 25%.

Another type of termination is accomplished by a process called "speltering", in which the end of the wire rope or strand is inserted into a cavity, or "basket", in a socket or other terminal fitting, the ends of the individual wires are arranged, or "broomed", in a spaced-apart relationship, and a flowable socketing material is introduced into the cavity and allowed to cure, or harden. Once the socketing material has hardened, the end of the wire rope or strand and the socket form a unitary speltered assembly, which can then be secured to an anchoring structure. This type of termination results in significantly less, if any, weakening of the wire rope, i.e., a termination efficiency of up to 100%.

Conventional socketing materials include zinc and epoxy. Unfortunately, both of these socketing materials lose holding ability at relatively low temperatures: zinc loses its holding ability at less than 750 degrees Fahrenheit, and epoxy loses its holding ability between 250 degrees Fahrenheit and 350 degrees Fahrenheit. It will be appreciated that if, for example, a fuel fire were burning at or above 1,600 degrees Fahrenheit on a bridge near a speltered assembly, the socketing material could weaken and release the end of the wire rope, thereby compromising the structural integrity of the assembly and the structure being supported.

SUMMARY OF THE INVENTION

The present invention overcomes the above-identified and other problems by providing a socketing material, or mortar, for speltering wire rope, strand, and other tension members, wherein the socketing material flows sufficiently to fill voids around the wires of which the wire rope or strand is comprised, cures sufficiently fast to avoid undue loss during speltering, and is able to withstand high temperatures once cured.

In one embodiment, the socketing material comprises approximately between 35% and 55% $AL_2O_3$; approximately between 32% and 52% $SiO_2$; approximately between 0% and 20% CaO; and approximately between 0% and 2% $Fe_2O_3$. The socketing material may have a continuous-use temperature of approximately at least 1000 degrees Fahrenheit, a continuous-use temperature of approximately at least 2000 degrees Fahrenheit, or a continuous-use temperature of approximately at least 2500 degrees Fahrenheit.

The socketing material is introduced into and allowed to cure within a cavity of a terminal fitting around the ends of a plurality of wires of a tension member which are arranged within the cavity in a spaced-apart relationship. This results in a speltered assembly comprising the terminal fitting having the cavity; the tension member having the plurality of wires, wherein the ends of the plurality of wires are arranged in a spaced-apart relationship within the cavity; and the socketing material is cured around the arranged ends of the wires within the cavity.

These and other features of the present invention are described in greater detail below in the section titled DETAILED DESCRIPTION.

BRIEF DESCRIPTION OF THE DRAWING FIGURES

FIG. 1 is an elevation view of one embodiment of the speltered assembly of the present invention shown with wire rope as the tension member;

FIG. 2 is a sectional view taken along line A-A of the speltered assembly of FIG. 1;

FIG. 3 is a sectional view taken along line B-B of the speltered assembly of FIG. 1.

DETAILED DESCRIPTION

Figure 4:
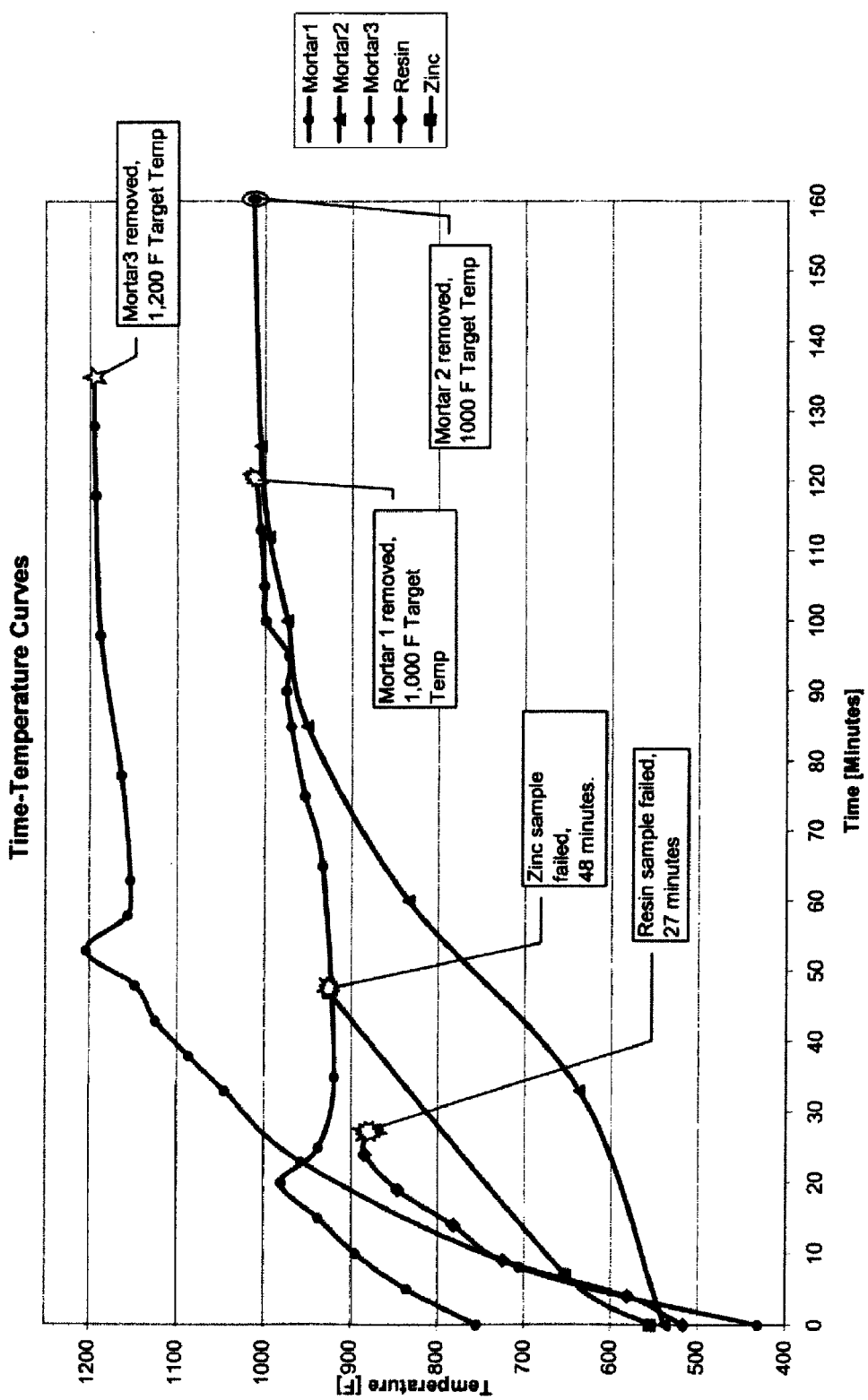
FIG. 4 is a graph of the results of time versus temperature testing of various socketing materials, including the socketing material of the present invention.

Though discussed herein in the context of terminating wire ropes, the present invention has application in terminating substantially any tension members, including, for example, wires, strands, and cables.

With reference to the figures, a socketing material and speltered assembly are herein described, shown, and otherwise disclosed in accordance with a preferred embodiment of the present invention. Broadly, the present invention concerns a socketing material, or mortar, for speltering wire rope, strand, and other tension members, wherein the socketing material flows sufficiently to fill voids around the wires of which the wire rope or strand is comprised, cures sufficiently fast to avoid undue loss during speltering, and is able to withstand high temperatures once cured. More specifically, the socketing material may have a continuous-use temperature of approximately at least 1000 degrees Fahrenheit, a continuous-use temperature of approximately at least 2000 degrees Fahrenheit, or a continuous-use temperature of approximately at least 2500 degrees Fahrenheit.

The socketing material may include, as major components, approximately between 35% and 55% $AL_2O_3$, approximately between 32% and 52% $SiO_2$, approximately between 0% and 20% CaO, and approximately between 0% and 2% $Fe_2O_3$. For example, the socketing material may include, as major components, approximately 45.3% $AL_2O_3$, approximately 41.9% $SiO_2$, approximately 9.0% CaO, and approximately 1.4% $Fe_2O_3$. One potentially suitable material for use as the socketing material is available as MATRICAST TUFFLOOR 2500, which is sold by Matrix Refractories, Inc., a division of Allied Mineral Products, Inc. The identified product is, as its name suggests, used for flooring.

The $SiO_2$, or sand, component acts as an aggregate in the socketing material and impinges upon the wires to further lock them into the cured material. The sand particles may be substantially round or rough in shape, depending on the desired performance characteristics of the material. For example, the sand may be #2 sand, which is a fine to medium sand approximately between $5 \times 10^{-3}$ inches to $19 \times 10^{-3}$ inches in size.

Additional components, or ingredients, may be added to the socketing material formulation to change or achieve one or more desirable properties or characteristics, such as flow rate, cure rate or cure temperature, strength, and melting point properties.

Referring to FIGS. 1 and 2, the speltered assembly 10 may include a terminal fitting 12, a wire rope 14, and the socketing material 16. The terminal fitting 12 may be a substantially conventional socket having a first end 20, a second end 22, and a cavity 24. The first end 20 is appropriately adapted to cooperate with or otherwise be connected to an anchor fitting on an anchoring structure. The second end 22 presents an opening 26 into the cavity 24, wherein the opening 26 has a diameter approximately equal to the diameter of the wire rope 14. The cavity 24, or "basket," may be substantially conical. Referring also to FIG. 3, the wire rope 14 includes a plurality of strands 30 twisted together, with each strand 30 comprising a plurality of wires 31 twisted together. The ends of the wires 31 may be roughened, bent, threaded, cleaned, or otherwise conditioned to further secure them within the socketing material 16. Furthermore, where the first end 20 of the terminal fitting 12 is open (as in FIG. 2), the ends of the wires 31 may be extended through the terminal fitting 12 and through the first end 20 and bent back over an area surrounding the first end 20 so as to further secure the wire rope 14 to the terminal fitting 12.

An end of the wire rope 14 is inserted through the opening 26 in the second end 22 of the socket 12 and into the cavity 24. The ends of the wires 31 are then "broomed," or arranged, in a spaced-apart relationship. The socketing material is then introduced into the cavity 24 and thereafter allowed to cure, or harden. The socketing material may be vibrated or otherwise agitated, or introduced under pressure, in order to ensure maximum dispersion into the interstices, or spaces, created between the broomed wires 31 within the cavity 24. The socketing material may be heated, supplemented, or otherwise conditioned to hasten the curing process. Once the socketing material 16 has cured, the wire rope 14 and the socket 12 form the unitary speltered assembly 10, with the wire rope 14 retaining a termination efficiency of approximately 100%.

Additionally, the socketing material cures at a temperature sufficiently low to avoid affecting the mechanical properties of the wire rope 14 or strand.

Referring particularly to FIG. 3, as mentioned the socketing material flows sufficiently to fill the interstices 34 around the wires 31 while still curing with sufficient speed to avoid significant loss due to leakage through the opening 26 in the second end 22 of the socket 12. Clay putty or a similarly malleable and otherwise suitable material may be used to plug the interstices 34 at the opening 26 to limit such leakage.

As desired, the terminal fitting can be reused by removing the old socketing material and removing the old wire rope. The terminal fitting can then, as needed, be prepared or conditioned, and a new wire rope and new socketing material can be installed in the manner described above.

An embodiment of the present invention has been tested using the aforementioned MATRICAST TUFFLOOR 2500 product as the socketing material and a 1⅜ inch diameter Grade 2 galvanized structural strand per ASTM A586. The minimum breaking force of the strand is 266,000 pounds. All of the test assemblies were found to have strengths in excess of 100% of the component strand minimum breaking force, with the wire failures occurring away from the sockets. More specifically, Test #1 found a strength of 282,276 pounds, Test #2 found a strength of 278,353 pounds, and Test #3 found a strength of 281,368 pounds.

An additional test assembly was axial-fatigued for 30,000 cycles at between 7,000 pounds and 20,000 pounds of tension. No wire failures were visible after this initial testing was complete. The test assembly was then tensile tested and found to have a strength of 278,032 pounds, with the wire failures occurring in the middle of the test assembly away from the socket.

Referring to FIG. 4, five test samples of approximately 1.5" diameter Grade 1 galvanized structural strand per ASTM A586 with socketed end connections were exposed to high temperature environments while under a tension loading of 56,000 lbs., approximately equal to 20% of the cable assembly's minimum breaking force. Mortar samples Nos. 1, 2, and 3 used the socketing material of the present invention, Sample No. 4 used zinc as the socketing material, and Sample No. 5 used resin as the socketing material. A target temperature of 1,000 degrees Fahrenheit was specified for sample Nos. 1, 2, 4, and 5 while a target temperature of 1,200 degrees Fahrenheit was specified for sample Nos. 3.

Sample Nos. 1 and 2 were exposed to temperatures up to 1,000 degrees Fahrenheit and showed no signs of slippage or yielding in the socket basket during the test. Sample Nos. 3 was exposed to temperatures up to 1,200 degrees Fahrenheit and showed no signs of slippage or yielding in the socket basket during the test. Sample No. 4 failed inside the basket of the socketed connection after 47 minutes due to the partial melting of the zinc spelter material in the socket basket. Sample No. 5 failed inside the basket of the socketed connection after 27 minutes due to the combustion of the resin spelter material in the socket basket.

| Sample Number | Socketing Material | Applied Tension lbs. | Avg. Oven Temperature | | Total Test Time in Oven Minutes |
|---|---|---|---|---|---|
| | | | C. | F. | |
| 1 | Mortar | 56,000 | 530.9 | 987.6 | 160 |
| 2 | Mortar | 56,000 | 534.2 | 993.5 | 120 |
| 3 | Mortar | 56,000 | 638.4 | 1181.1 | 135 |
| 4 | Zinc | 56,000 | 406.9 | 764.4 | 48 |
| 5 | Resin | 56,000 | 395.9 | 744.7 | 27 |

Although the invention has been disclosed with reference to one or more embodiments, it is understood that equivalents may be employed and substitutions made herein without departing from the scope of the invention as recited in the claims.

Having thus described the preferred embodiment of the invention, what is claimed as new and desired to be protected by Letters Patent includes the following:

1. A speltered assembly comprising:
   a terminal fitting having a cavity;
   a tension member having a plurality of wires, wherein the ends of the plurality of wires are arranged in a spaced-apart relationship within the cavity; and
   a cementitious socketing material cured around the arranged ends of the wires within the cavity, wherein after the socketing material is cured the socketing material has a continuous-use temperature of approximately at least 1,000 degrees Fahrenheit, the socketing material including—
      approximately between 35% and 55% $Al_2O_3$,
      approximately between 32% and 52% $SiO_2$,
      approximately between 0% and 20% CaO, and
      approximately between 0% and 2% $Fe_2O_3$.

2. The speltered assembly as set forth in claim 1, wherein the tension member is a wire rope.

3. The speltered assembly as set forth in claim 1, wherein the tension member is a strand.

4. The speltered assembly as set forth in claim 1, wherein the socketing material has a continuous-use temperature of approximately at least 2,000 degrees Fahrenheit.

5. The speltered assembly as set forth in claim 1, wherein the socketing material has a continuous-use temperature of approximately at least 2,500 degrees Fahrenheit.

6. In a speltered assembly including a terminal fitting having a cavity, a tension member having a plurality of wires arranged in a spaced-apart relationship within the cavity, and a socketing material cured around the ends of the wires within the cavity, wherein after the socketing material is cured the socketing material has a continuous-use temperature of approximately at least 1,000 degrees Fahrenheit, the improvement comprising:
   the socketing material including—
      approximately between 35% and 55% $AL_2O_3$;
      approximately between 32% and 52% $SiO_2$;
      approximately between 0% and 20% CaO; and
      approximately between 0% and 2% $Fe_2O_3$.

7. The speltered assembly as set forth in claim 6, wherein the tension member is a wire rope.

8. The speltered assembly as set forth in claim 6, wherein the tension member is a strand.

9. The speltered assembly as set forth in claim 6, wherein the socketing material has a continuous-use temperature of approximately at least 2,000 degrees Fahrenheit.

10. The speltered assembly as set forth in claim 6, wherein the socketing material has a continuous-use temperature of approximately at least 2,500 degrees Fahrenheit.

11. The speltered assembly as set forth in claim 6 wherein the socketing material is cementitious.

12. A speltered assembly comprising:
    a terminal fitting having a cavity;
    a tension member having a plurality of strands, wherein the ends of the plurality of wires are arranged in a spaced-apart relationship within the cavity; and
    a socketing material introduced into the cavity and cured around the arranged ends of the wires, the socketing material once cured having a continuous-use temperature of approximately at least 1,000 degrees Fahrenheit.

13. The speltered assembly as set forth in claim 12, wherein the tension member is a wire rope.

14. The speltered assembly as set forth in claim 12, wherein the tension member is a strand.

15. The speltered assembly as set forth in claim 12, wherein the socketing material has a continuous-use temperature of approximately at least 2,000 degrees Fahrenheit.

16. The speltered assembly as set forth in claim 12, wherein the socketing material has a continuous-use temperature of approximately at least 2,500 degrees Fahrenheit.

17. A speltered assembly comprising:
    a terminal fitting having a cavity;
    a tension member having a plurality of wires, wherein the ends of the plurality of wires are arranged in a spaced-apart relationship within the cavity; and
    a cementitious socketing material cured around the arranged ends of the wires within the cavity, wherein after the socketing material is cured the socketing material has a continuous-use temperature of approximately at least 1,000 degrees Fahrenheit, the socketing material consists essentially of—
    approximately between 35% and 55% $Al_2O_3$,
    approximately between 32% and 52% $SiO_2$,
    approximately between 0% and 20% CaO, and
    approximately between 0% and 2% $Fe_2O_3$.

* * * * *